G. T. CASTLE.
POWER ATTACHMENT FOR AUTOMOBILES.
APPLICATION FILED FEB. 24, 1917.

1,257,976.

Patented Mar. 5, 1918.

Inventor
G. T. Castle

By
Attorneys

UNITED STATES PATENT OFFICE.

GEORGE T. CASTLE, OF OLYMPIA, WASHINGTON.

POWER ATTACHMENT FOR AUTOMOBILES.

1,257,976.   Specification of Letters Patent.   Patented Mar. 5, 1918.

Application filed February 24, 1917. Serial No. 150,732.

*To all whom it may concern:*

Be it known that I, GEORGE T. CASTLE, a citizen of the United States, residing at Olympia, in the county of Thurston and State of Washington, have invented certain new and useful Improvements in Power Attachments for Automobiles, of which the following is a specification.

My invention relates to new and useful improvements in power attachments for automobiles, the primary object of my invention being the provision of a drive shaft structure which may be connected directly to the crank receiving end of the crank shaft of the engine and from which power may be transmitted to any desired machine or to a distributer shaft and so to a number of machines.

In this connection, a further object which I have in view is the arrangement of a supplemental power shaft of the above described character which may be readily applied to the crank shaft of the engine or removed therefrom at will and which will not necessitate any changes in the vehicle structure.

A still further object which I accomplish by my present invention is the provision of a structure in which all moving parts are properly journaled and lubricated to prevent undue friction and consequent loss of power.

With these and other objects in view, my invention will be more fully described, illustrated in the accompanying drawings, and then specifically pointed out in the claims which are attached to and form a part of this application.

In the drawing.

Corresponding and like parts are referred to in the following description and indicated in all the views of the drawings by the same reference characters.

Figure 1:
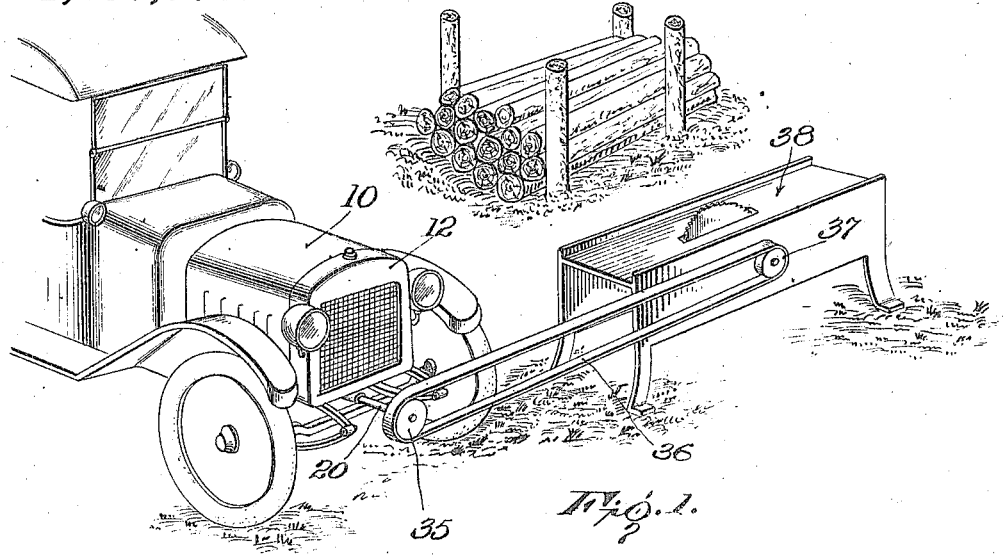
Figure 1 is a perspective view showing my invention in use.
Figure 2:
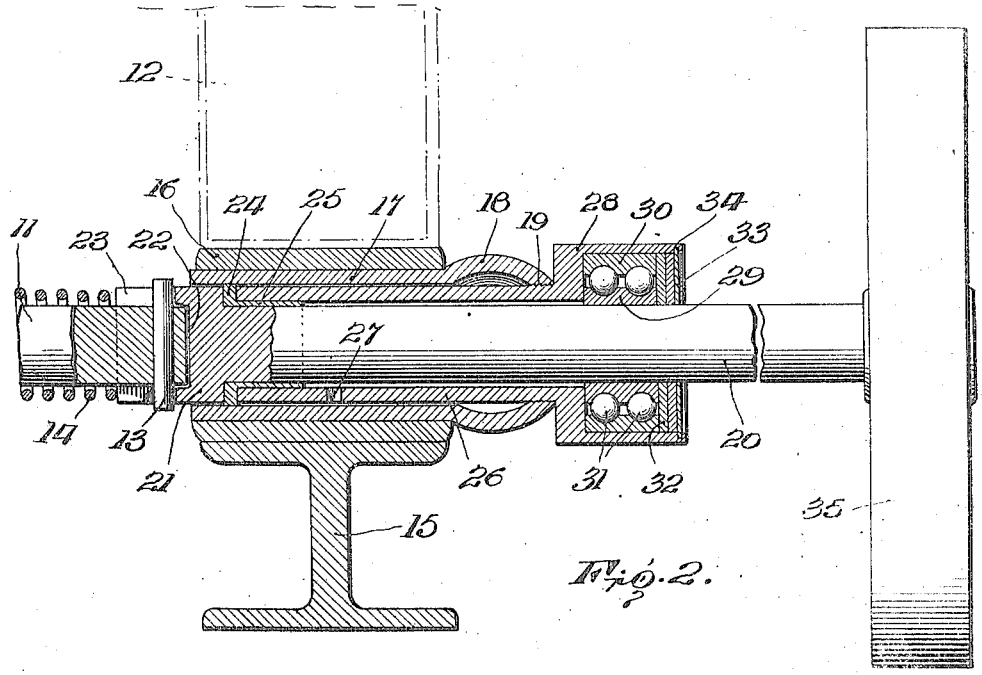
Fig. 2 is a central longitudinal sectional view of the power shaft applied.

In order to insure a clear and accurate understanding of my invention and its application, I have illustrated it attached to a conventional form of motor vehicle 10 having the usual crank shaft 11, the forward end of which projects to a point slightly beneath and at the rear of the lower portion of the radiator 12. This forward end of the crank shaft is provided with the usual hand crank engaging pin 13 and may or may not carry a helical spring 14 for throwing the hand crank out of position after starting the engine. The radiator is supported upon the cross frame member 15 in the customary manner and interposed between the radiator and this member is a bracket or bearing 16 formed centrally with an opening to receive the usual tubular housing 17 which alines with the crank shaft and which receives and journals the hand crank when the latter is employed. This tubular housing 17, at its forward end, projects beyond the radiator somewhat and terminates in an enlargement 18, the open end of which is internally threaded, as shown at 19, to receive a plug cap when the hand crank is not in use. As this structure is one commonly employed in the manufacture of motor vehicles, in which electrical starting devices are provided and in which, as a result, the hand crank is seldom used, any further explanation is believed to be unnecessary.

My present invention includes a drive shaft 20 of any desired length formed at one end with an enlarged head 21 proportioned to pass through the housing 17 and formed with a socket 22 to receive the free end of the crank shaft 11, this socket having its walls slotted at diametrically opposite points, as shown at 23, to seat the crank pin 13. Disposed about the shaft 20 and abutting against the annular flange formed by the juncture of the shaft and its head, is a bushing collar 24 provided with a sleeve 25 which fits loosely about the shaft. A combined bearing and retaining sleeve 26 fits loosely between the shaft 20 and the housing 17 and engages at one end against the collar 24, fitting snugly about the sleeve of such collar. This bearing sleeve 26, adjacent its outer end, is externally threaded for engagement with the threads 19 of the housing and the sleeve is so proportioned in length that when it has threaded engagement with this housing it forces the shaft 20 rearwardly to locking engagement with the crank shaft 11 and holds it in such position irrespective of the spring 14.

The shaft 20 rotates within this bearing sleeve 26 and the space between them is preferably filled with grease or other lubricant, a lubricant opening 27 being formed in the sleeve somewhere within its length so that a certain amount of the lubricant may escape into the housing 17 and oil the enlarged head of the shaft. The outer end of the bearing sleeve 26 is enlarged to provide a cylindrical bearing casing 28 having a closed end engaging against the outer end of the housing 17 and having its other end open. Inner and outer ball bearing retaining rings 29 and 30 are interposed within this enlarged end 28 of the sleeve, one being fixed to the shaft and the other to the bearing sleeve and provide raceways for ball bearings 31. One or more felt washers 32 are positioned in the outer end of the enlargement 28 of the bearing sleeve and a spring ring 33 holds them in place, engaging preferably in a channel 34 formed interiorly of the part 28.

The outer end of the shaft 20 may project to any desired extent and fixed upon it is a pulley 35, sprocket wheel or other equivalent power transmitting element. As shown in Fig. 1, a belt 36 may be trained about this pulley and about the drive pulley 37 of any machine to be driven, such as the power saw 38. This belt may, of course, be run to a drive shaft from which power may be transmitted to a number of independent machines, if desired. Furthermore, a power transmitting shaft may be directly connected to the shaft 20 by a universal joint or other equivalent means, if such an arrangement is deemed advisable. In other words, my invention resides in the particular manner of connecting the shaft 20 to the crank shaft of an engine and in the particular bearings and supports provided for it and I do not wish in any way to limit myself to the specific details of construction but reserve the right to make any changes within the scope of the appended claims, such as may be necessary to adapt it for use with different types of automobiles and for transmitting power to different types of machinery.

Having thus described the invention, what is claimed as new is:

1. In a power attachment for motor vehicles, the combination with the crank shaft of an engine and the hand crank receiving sleeve alining therewith, of a power shaft, and means co-acting between the power shaft and sleeve for detachably securing the power shaft to the crank shaft.

2. In a power attachment for motor vehicles, the combination with the crank shaft of an engine and the hand crank receiving sleeve alining therewith, of a power shaft provided at one end with a socketed head insertible through the sleeve to lockingly receive the end of the crank shaft, and a bearing sleeve insertible within the first sleeve and having threaded engagement at the outer end thereof, the second sleeve abutting against the head of the shaft to hold the shaft in engagement with the crank shaft.

3. In a power attachment for motor vehicles, the combination with the crank shaft of an engine having a pin for locking engagement with a hand crank and a sleeve adapted to form a bearing for the hand crank and alining with the crank shaft, of a power shaft formed at one end with an enlarged head insertible through the sleeve and provided with a socket to seat the end of the crank shaft, the walls of the socket being slotted to receive the pin, a bushing surrounding the power shaft and engaging against its head, a shaft bearing sleeve surrounding the shaft within the first sleeve and engaging the bushing and having threaded engagement with the outer end of the first sleeve, a housing formed upon the outer end of the shaft bearing sleeve, and ball bearings supported within the housing and coöperating with the power shaft.

4. In a power attachment for motor vehicles, the combination with a crank shaft of an engine, and the hand crank receiving sleeve alining therewith, of a power shaft adapted for detachable locking engagement with the crank shaft, and a bearing sleeve journaling the power shaft and adapted for detachable engagement with the first sleeve.

5. In a power attachment for motor vehicles, the combination with a crank shaft of an engine and the hand crank receiving sleeve alining therewith, of a power shaft adapted for detachable locking engagement with the crank shaft, and a bearing sleeve journaling the power shaft and adapted for detachable engagement with the first sleeve, the bearing shaft when engaging the first sleeve securing the power shaft against displacement.

In testimony whereof I affix my signature.

GEORGE T. CASTLE. [L. S.]